US006017247A

United States Patent [19]
Gwiazdowski

[11] Patent Number: 6,017,247
[45] Date of Patent: Jan. 25, 2000

[54] ARRANGEMENT OF CONTACT PAIRS FOR COMPENSATION OF NEAR-END CROSSTALK

[75] Inventor: Michael Gwiazdowski, Berlin, Germany

[73] Assignee: Krone Aktiengesellschaft, Berlin-Zehlendorf, Germany

[21] Appl. No.: 09/034,973

[22] Filed: Mar. 4, 1998

[30] Foreign Application Priority Data

Mar. 5, 1997 [DE] Germany .................. 197 08 798

[51] Int. Cl.[7] .................................................. H01R 23/02
[52] U.S. Cl. ........................................ 439/676; 439/941
[58] Field of Search ............................. 439/676, 941

[56] References Cited

FOREIGN PATENT DOCUMENTS

| | | |
|---|---|---|
| 0 525 703 A1 | 2/1993 | European Pat. Off. . |
| 0 598 192 A1 | 5/1994 | European Pat. Off. . |
| 0 601 829 A2 | 6/1994 | European Pat. Off. . |
| 0 603 667 A2 | 6/1994 | European Pat. Off. . |
| 0 674 364 A1 | 9/1995 | European Pat. Off. . |
| 0 692 884 A1 | 1/1996 | European Pat. Off. . |
| 0 708 501 A1 | 4/1996 | European Pat. Off. . |
| WO 93/19500 | 9/1993 | WIPO . |
| WO 94/06216 | 3/1994 | WIPO . |
| WO 95/15598 | 6/1995 | WIPO . |
| WO 95/19056 | 7/1995 | WIPO . |

*Primary Examiner*—Neil Abrams
*Assistant Examiner*—Javald Nasri
*Attorney, Agent, or Firm*—McGlew and Tuttle, P.C.

[57] ABSTRACT

The invention relates to an arrangement of at least two contact pairs (1, 2; 3, 4) for compensation of near-end crosstalk, in which one or both contacts (1, 2 or 3, 4) of a contact pair (1, 2; 3, 4) are designed to be angled away once or more than once from a contact region (5), with the result that the contacts (1, 2 and 3, 4) then run parallel once more and the distance between the contacts (1, 3 and 2, 4) of different contact pairs is designed such that crosstalk which is in antiphase with the contact region (5) is produced.

16 Claims, 8 Drawing Sheets

ARRANGEMENT OF CONTACT PAIRS FOR COMPENSATION OF NEAR-END CROSSTALK

FIELD OF THE INVENTION

The invention relates to an arrangement of contact pairs for compensation of near-end crosstalk involving at least two contact pairs for a connection device for voice or data transmission.

BACKGROUND OF THE INVENTION

On account of magnetic and electrical coupling between two contact pairs, one contact pair induces a current in neighboring contact pairs, or influences electrical charges, thereby producing crosstalk. In order to avoid near-end crosstalk, the contact pairs can be arranged very far away from one another or a shield can be arranged between the contact pairs. However, if it is necessary to arrange the contact pairs structurally very close together, the measures described above cannot be implemented and the near-end crosstalk must be compensated for.

A known method for reducing near-end crosstalk in plugs is compensation downstream of the plug contacts. This is done by deliberate additional coupling which, however, in contrast to the coupling in the contact region, constitutes a component in antiphase and consequently reduces the overall crosstalk. For this purpose, a pair of leads is deliberately transposed downstream of the plug contact, with the result that an additional coupling in antiphase is effected downstream of the crossover point. Alternatively, as disclosed in EP 0525703, the compensation can be effected by additional discreet capacitors downstream of the plug contact. The disadvantage of this compensation method is that the contact length and the distance between the center of the contact and the compensation location impose a physical limit for high frequencies on the scope of the compensation, with the result that this type of compensation has only limited applicability for relatively high transmission rates.

SUMMARY AND OBJECTS OF THE INVENTION

The invention is therefore based on the technical problem of providing an arrangement of contact pairs in which compensation of near-end crosstalk is ensured even at relatively high transmission rates. A further technical problem of the invention is to provide an arrangement of contact pairs which is also compatible with the plug connectors used hitherto.

According to the invention, an arrangement of at least two contact pairs is provided with one or more contacts of a contact pair angled away once or more than once from a contact region, with the result that the contacts then run parallel once more and the distance between the contacts of different contact pairs is designed such that crosstalk which is in antiphase with the contact region is produced in this region.

The fact that one or both contacts of a contact pair are designed to be angled away once or more than once from a contact region, with the result that the contacts then run parallel once more and the distance between the contacts of different contact pairs is designed such that crosstalk which is in antiphase with the crosstalk in the contact region is produced, this crosstalk being just mutually compensating in the ideal case, leads to adequate crosstalk attenuation being achieved even at high transmission frequencies. As a result, the compensation is integrated directly into the contact, without the individual contacts crossing over physically, by which means the limit on the compensation action is shifted to higher frequencies. The physical configuration of the contacts in the compensation region depends sharply on the method in which the contacts of the individual contact pairs are designed in relation to one another in the contact region, for example beside one another or nested. However, what is common is that, given a displacement of the contact pairs in relation to one another, there is always a position in which complete decoupling, and beyond the decoupled position, crosstalk in antiphase occurs. As a result of the bending away of the contacts, the contacts are brought precisely into this position. Further advantageous refinements of the invention are discussed below.

If the contacts of a contact pair are arranged parallel and beside one another in the contact region, then the antiphase cross talk is produced precisely when the distance between the contacts of different contact pairs is smaller than the distance between the contacts of one contact pair, whereas in the case of symmetrically nested contact pairs this occurs when the planes covered by the contacts of one contact pair include an angle $a<90°$ (the decoupled position is just at $90°$).

The design of the contacts such that they are at least partially flattened increases the capacitance between the contacts, thereby increasing the compensation, since this has the same effect as enlarging the area of a capacitor plate. In a further preferred embodiment, a respective contact of a contact pair, following the equidirectional extension, is rotated or angled away again toward its associated contact until the smaller distance again produces crosstalk which is in phase with the crosstalk in the contact region. In the case of this embodiment, the crosstalk in antiphase is then selected precisely such that it is equal to the sum of the crosstalk in the contact region and the additional crosstalk, the in-phase crosstalk additionally produced preferably being selected to have exactly the same magnitude as the crosstalk in the contact region. In order to limit the compensation region in the direction of a connecting cable with which contact is to be made, it is possible either to extend the contacts in a decoupled position or arrange a shield between the contact pairs.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 7b is a diagram showing an arrangement in order to compensate the crosstalk in an arrangement according to FIG. 7a;

DESCRIPTION OF THE PREFERRED EMBODIMENT

Figure 1:
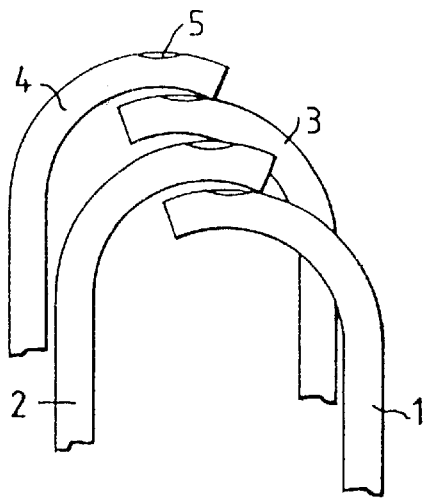
FIG. 1 is a perspective view of two contact pairs with compensation in antiphase.

Referring to the drawings in particular, FIG. 1 shows a perspective illustration of an arrangement of two contact pairs, 1, 2 and 3, 4, which are each designed with a contact region 5 for making contact with a mating element. If the contact pairs 1, 2 and 3, 4 are arranged in a plug, then the mating element would be a socket, for example. In this case, the two respective contacts 1, 2 and 3, 4 belonging to a contact pair 1, 2; 3, 4 are first extended in opposite directions following on from the contact region 5 and are then turned in the same direction again. As a result, the distance between the contacts 1 and 3, and 2 and 4 is smaller than the distance between the contacts 1 and 2, and 3 and 4, as a result of which the crosstalk in this region has an opposite polarity to the crosstalk in the contact region 5, where the contact pair 1, 2 induces current in the contact pair 3, 4 or influences charges. Consequently, as a result of the crosstalk in antiphase, the near-end crosstalk in the contact region 5 is deliberately compensated for alone or together with possible crosstalk in the mating element. This compensation can be enhanced by a flattened design of the contacts 1, 2, 3, 4, since the capacitance between the respective contacts 1, 3 and 2, 4 is proportionally increased by the enlargement of the areas respectively opposite one another in the case of the contacts 1, 3 and 2, 4. In order to achieve complete compensation, the degree of crosstalk in antiphase must correspond exactly to the near-end crosstalk in the contact region 5. For this reason, it is possible for the compensation region in the direction of a possible connecting cable to be limited by means of a shield between the contact pairs 1, 2; 3, 4. Alternatively the contacts 1, 2, 3, 4 can be extended in a decoupled position.

Figure 2:
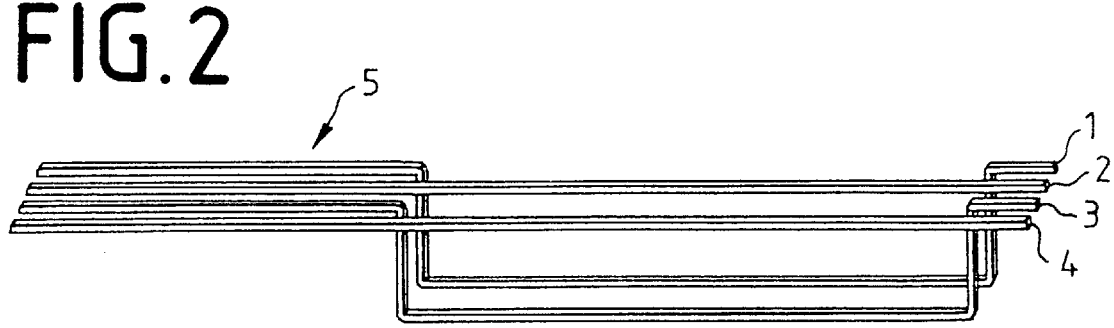
FIG. 2 is a perspective view of a further arrangement of two contact pairs with compensation in antiphase in a perspective illustration.

FIG. 2 illustrates an alternative arrangement having two contact pairs 1, 2; 3, 4, in which the contacts 1, 3 are firstly angled away from the contact region 5 by 90° to their associated contacts 2, 4 and, following this, angled away once more through 90°, specifically such that the contacts 1, 3 are arranged always parallel to one another, and all the contacts 1, 2, 3, 4 are arranged parallel to one another in the compensation region. In the compensation region, the distance between the contacts 1 and 3, and 2 and 4 is then smaller than between the contacts 1, 2 and 3, 4 of an associated contact pair 1, 2; 3, 4. In order to terminate the compensation region, the contacts 1, 3 are then angled away once more twice, so that the contacts 1, 2, 3, 4 are subsequently mutually arranged to correspond to the contact region 5 or are extended as explained above, for example in a decoupled position.

Figure 3:
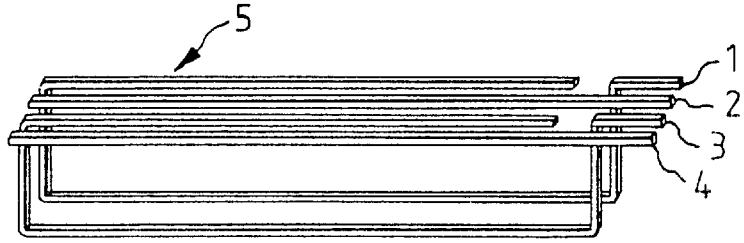
FIG. 3 is perspective view of a further arrangement of two contact pairs with compensation in antiphase in a perspective illustration.
Figure 4:
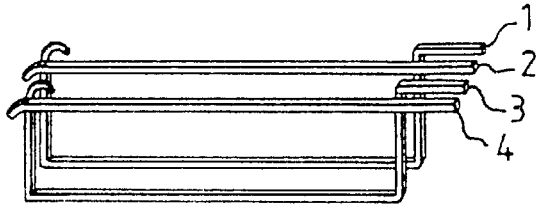
FIG. 4 is a perspective view of a further arrangement of two contact pairs with compensation in antiphase in a perspective illustration.

Illustrated in FIG. 3 is a further alternative embodiment, in which the contacts 1, 3 are led back once more in loops. Illustrated in FIG. 4 is an embodiment which represents a combination of the embodiments according to FIGS. 1 and 3.

Figure 5:
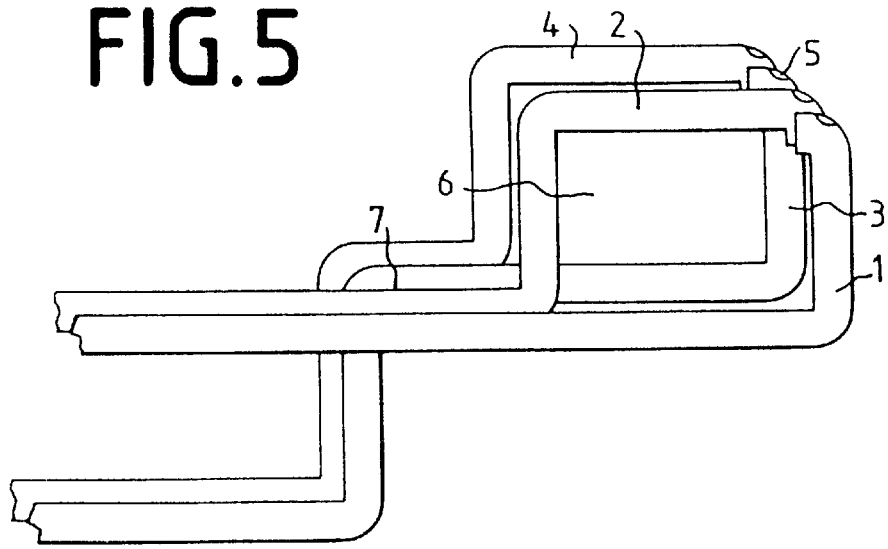
FIG. 5 is a perspective view of two contact pairs with compensation in antiphase and in-phase compensation.

Illustrated in FIG. 5 is an arrangement of contact pairs 1, 2; 3, 4 in which compensation both in antiphase and in phase of the crosstalk in the contact region 5 is effected. The antiphase compensation is in this case achieved by means of an appropriate contact design according to FIG. 1, the contacts 1, 2, 3, 4 being of angled-away design in this exemplary embodiment. Following this first compensation region 6 the contacts 2, 4 are then angled away once more and extended toward their associated contacts 1, 3. Following this, the contacts 2, 4 are angled away once more, so that all the contacts 1, 2, 3, 4 run parallel to one another. This results in the contact pairs 1, 2; 3, 4 in each case inducing currents or influencing charges in the other contact pair 3, 4; 1, 2. This crosstalk produced is once more in phase with the crosstalk in the contact region 5. The region where the contacts 1, 2, 3, 4 are led in parallel thus defines a second compensation region 7, which in turn partially cancels the effect of the compensation region 6. The basic idea in this case is firstly initially to overcompensate the crosstalk present and then to compensate for the overcompensation, which leads to more intensive attenuation of crosstalk, with the result that the arrangement can be operated at still higher frequencies. The crosstalk in the compensation region 7 is preferably selected to be exactly as large as the crosstalk in the contact region 5. In order to limit the compensation region 7, the contact pair 3, 4 is designed to be angled away once more twice, with the result that the two contact pairs 1, 2 and 3, 4 are led in parallel in a decoupled position to corresponding connecting cables.

Figure 6:
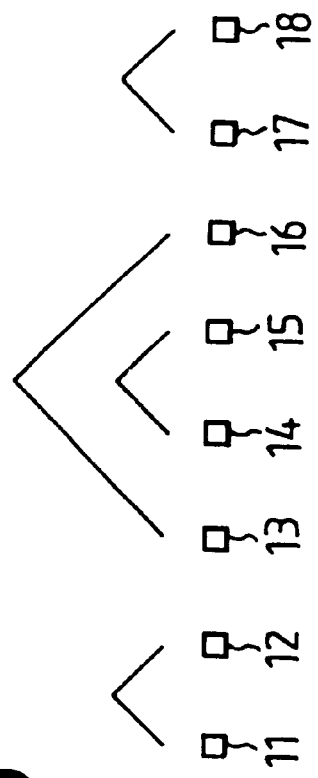
FIG. 6 is a diagram showing the pin allocation of an RJ-45 plug connector (prior art)

The preceding embodiments according to FIGS. 1–5 are in principle suitable for multiple plug connections. However, in order to achieve compatibility with already existing plug connections, in particular with respect to is the mechanical dimensions and the pin allocation, additional measures are necessary. To this end, the pin allocation for an RJ-45 plug are illustrated, for example, in FIG. 6. The RJ-45 plug is the most widespread plug connector for symmetrical data cables, in which in Category 5, with an appropriate socket, crosstalk attenuation of >40 dB between all four conductor pairs can be achieved at 100 MD transmission frequency. As can be seen from FIG. 6, the associated contacts of a contact pair are not always located directly beside one another, but rather the two central contact pairs 13, 16 and 14, 15 are nested, which results in particularly severe crosstalk.

Figure 7A:
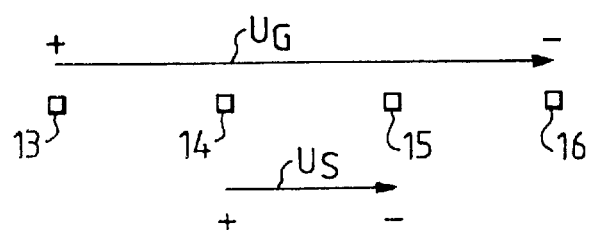
FIG. 7a is a diagram showing two nested contact pairs with crosstalk.
Figure 7B:
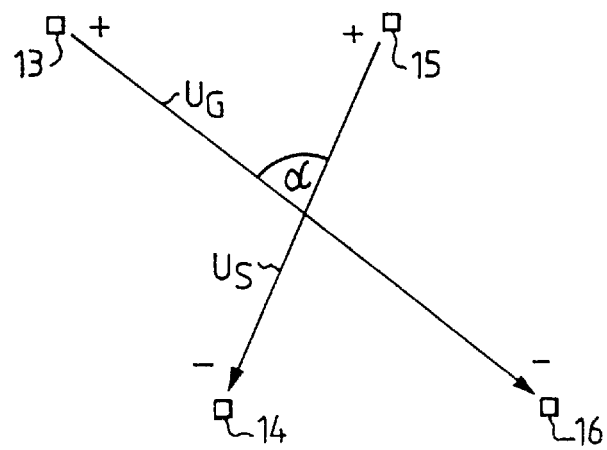
Figure 8:
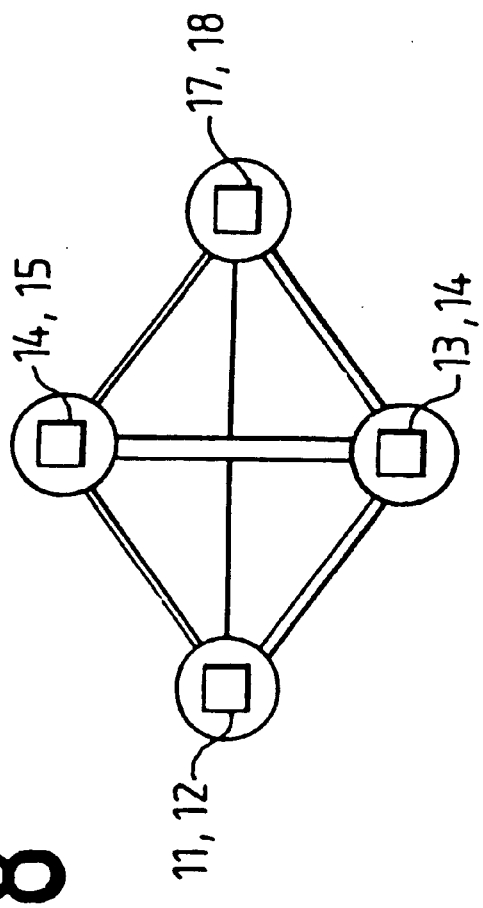
FIG. 8 is a schematic illustration of the coupling relationships of an arrangement having 4 contact pairs with partial nesting.

The nested arrangement of contact pairs 13, 16; 14, 15 with an excitation voltage $U_G$ on the outer contact pair 13, 16 and an influenced crosstalk voltage $U_S$ on the inner contact pair 14, 15 is illustrated in FIG. 7a. Because of the low distances between the contacts 13 and 14, and 15 and 16, the crosstalk voltage has the same sign as the excitation voltage $U_S$. In accordance with the considerations above, it is possible to find a position for the contacts 14 and 16 in which complete decoupling is achieved between the contact pairs 13, 16; 14, 15, namely when the two planes covered by the contact pairs 13, 16; 14, 15 are at right angles to one another. If the contacts 14, 16 are displaced further, then the crosstalk voltage $U_S$ changes its sign, which can be utilized for the previously described compensation, and is illustrated in FIG. 7b. However, in the case of an RJ-45 plug connector, there is a mixed relationship, that is to say the contacts of a contact pair partly lie beside one another and are partly nested in one another. It is therefore necessary to provide a contact arrangement in which all four contact pairs are decoupled from one another at the same time. In the case of four contact pairs there are six couplings between the contact pairs, the intensity of these couplings being shown by the thickness of the line in FIG. 8.

In the following text, the design of a plug connection compatible with known RJ-45 plug pin allocation will be gradually explained. As a first step, the crosstalk is reduced as far as possible in general by means of structural changes, in that the contacts in the socket run in parallel only in the contact region towards the plug and in the region of necessary guides. Furthermore, the large contact surfaces in the plug are replaced by small contacts. As a result of the partially nested arrangement of the contact pairs, however, it is not possible for a desired crosstalk attenuation of 50 dB at 300 MHz to be achieved for all combinations, with the result that the previously described compensation measures have to be applied. In addition to the identical pin allocation and the same geometrical dimensions, compatibility is also to be understood as upward compatibility of the socket according to the invention with an RJ-45 plug according to the prior art, that is to say the socket, in combination with the known plug, must satisfy Category 5 (crosstalk attenuation >40 dB at 100 MHz transmission frequency). For this reason appropriately large compensation between the contact pairs 13, 16; 14, 15 in the socket is necessary, in order that the high crosstalk values of the plug can be compensated for in accordance with the prior art. This compensation is greater than would be necessary for an RF plug according to the invention. By contrast, however, the compensation should be as small as possible in order to achieve the highest possible transmission frequencies given the combination of RF plug and RF socket These mutually opposing requirements require a compromise, in that the compensation is selected to be smaller than would be necessary for the crosstalk of the Category 5 plug. This is also possible since only 40 dB at 100 MHz transmission frequency are necessary for Category 5, and exact compensation is not necessary.

Figure 9:
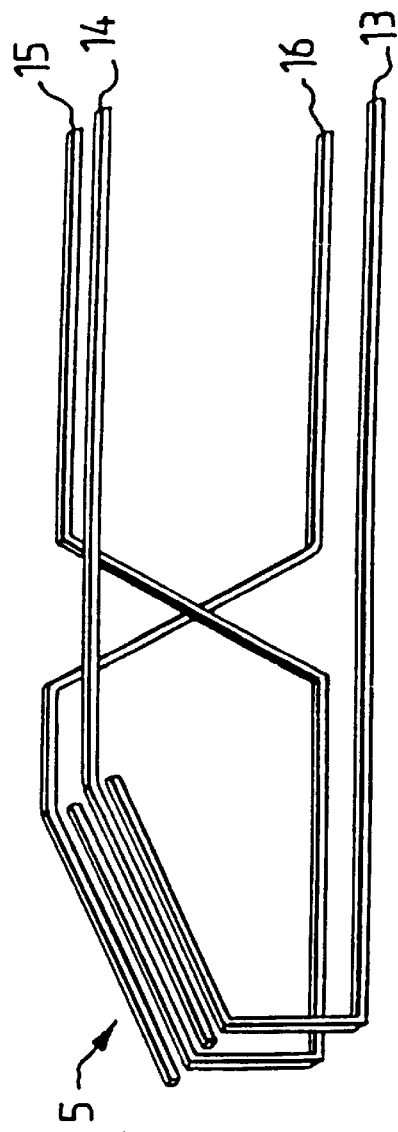
FIG. 9 is a perspective view of an arrangement of the two nested contact pairs in a socket for high transmission frequencies with simultaneous compatibility with prior art plugs.

One possible arrangement of the contact pairs 13, 16; 14, 15 for the socket is illustrated in FIG. 9, which is essentially based on the principle according to FIG. 3. Following the compensation region, the respectively associated contacts 13, 16 and 14, 15 are led together. The very large distance still produces only very low crosstalk and can be included at the same time in the compensation when designing the socket. The arrangement comprises compensation loops which are alternately rotated to the right and to the left. Each individual contact 13–16 is, as before, a two-dimensional arrangement. Since the compensation is virtually integrated into the contact region, the compensation is physically very close to the location of the crosstalk and results in a high limiting frequency.

Figure 10:
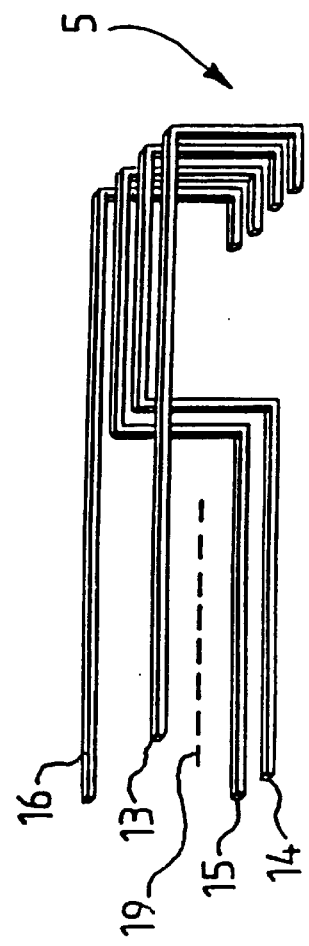
FIG. 10 is a perspective view of an arrangement of the two nested contact pairs in a plug for high transmission frequencies.

In the contact region of the RF plug associated with the socket, the contacts 13–16 are located in parallel, as in the socket, and there amplify the crosstalk which has already been generated in the contact region of the socket. Plug and socket are then matched to one another and produce a maximum of crosstalk attenuation if the crosstalk of plug and socket is equal in terms of magnitude to the compensation which is generated in the socket by the compensation loops. Because of the relatively high required compensation in the socket, the crosstalk in the RF plug must be artificially increased. To this end, the contacts 13–16, as illustration in FIG. 10, are extended in parallel. In order to limit the crosstalk in the plug precisely, following the compensation region a shield is provided between the two contact pairs 13, 16; 14, 15, which are arranged very close alongside one another, the shield reaching as far as the region of the cable connection.

Figure 11:
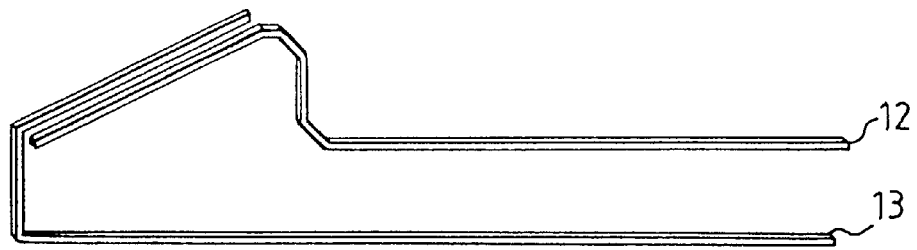
FIG. 11 is a perspective view showing an arrangement of a contact of a contact pair with contacts lying together in relation to an adjacent contact of a contact pair with nested contacts.
Figure 12:
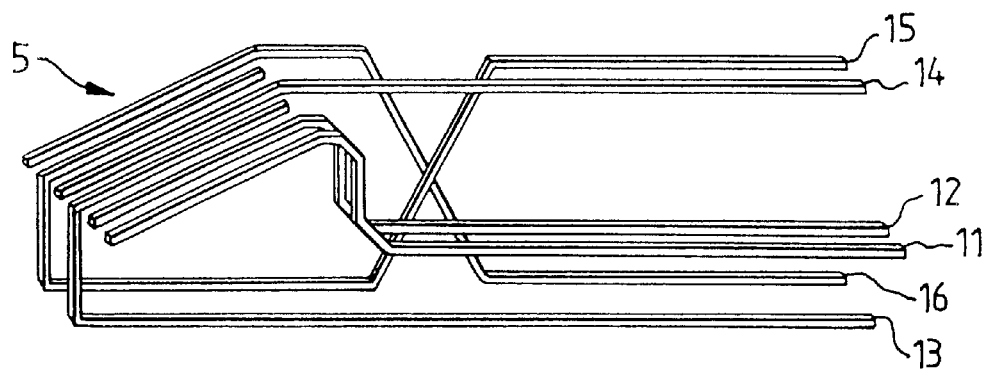
FIG. 12 is a perspective view showing an arrangement of three contact pairs in a socket for high transmission frequencies, two contact pairs being nested in one another.

As the next step, consideration must be given to how the contact pair 11, 12 is to be arranged in the socket and plug. What is particularly critical is the crosstalk between the closely adjacent contacts 12 and 13. Deliberate compensation between the contact pairs 11, 12 and 13, 16 by means of a further suitable compensation loop of the two contacts 11, 12 is not possible, since this compensation loop would also result in undesired coupling with the compensation loop of the contacts 14, 15. For this reason, the two contacts 12 and 13, as can be seen in FIG. 11, are designed to be parallel but in mutually opposite directions in the contact region, that is to say the signal currents flow in opposite directions from the contact region, by which means magnetic coupling is largely suppressed. The remaining electrical coupling is low, such that crosstalk attenuations >50 dB at 300 MD can be achieved. Since no compensation loop is needed, the contact 11 is led parallel to the contact 12, so that the provisional contact arrangement for the socket according to FIG. 12 results. Following the contact region, the contact pair 11, 12 is extended in a decoupled position with respect to the contact pairs 13, 16; 14, 15. This achieves good decoupling with respect to the contact pair 13, 16. The shape of the contact 12 with respect to contact 14 is unfavorable, since these are once more arranged in the same direction as one another, the crosstalk attenuation still being sufficiently good, however, on account of the distance having been doubled.

Figure 13:
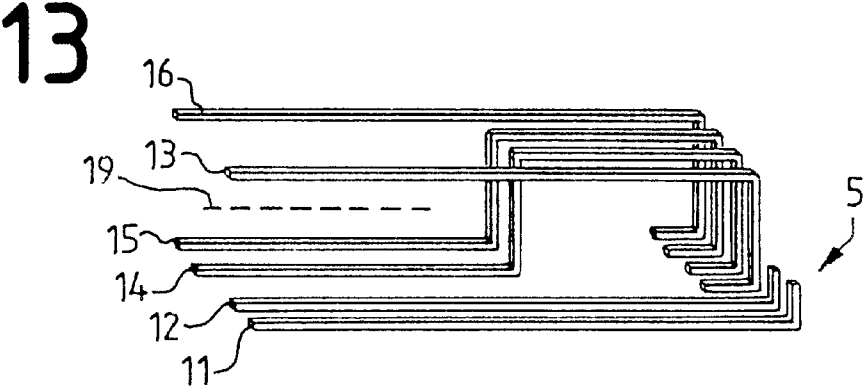
FIG. 13 is a perspective view showing an arrangement of three contact pairs in a plug for high transmission frequencies, two contact pairs being nested in one another.

The arrangement of the contact pair 11, 12 in the plug is illustrated in FIG. 13. In order to keep the crosstalk on the adjacent contacts 13–16 as low as possible, the two contacts 11, 12 are led downward in the opposite direction to the former.

Figure 14:
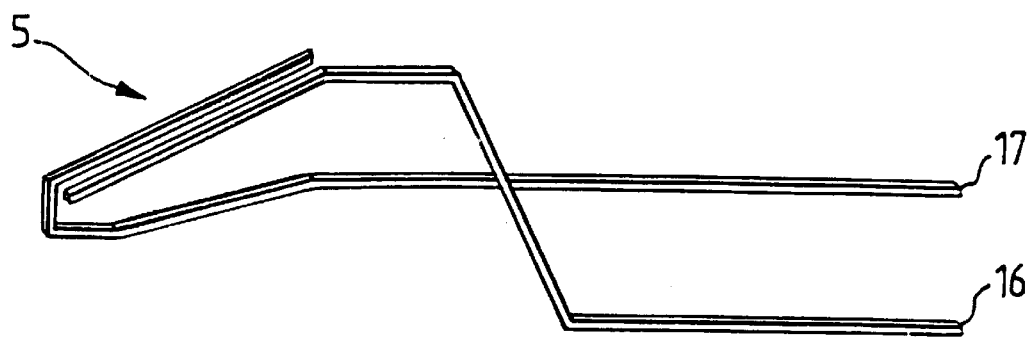
FIG. 14 is a perspective view showing an arrangement of a contact of a contact pair with contacts lying together in relation to an adjacent contact of a contact pair having nested contacts.

For the arrangement of the contact pair 17, 18 it is in particular the crosstalk between the contacts 17 and 16 that is critical. Corresponding on the embodiments relating to the contact pair 11, 12, a compensation loop in the socket also fails here, since this would result in undesired crosstalk in the contact pair 14, 15. Therefore, according to FIG. 14, compensation is initially omitted and, in order to avoid the magnetic induction, contact 17 is designed to be in the opposite direction and parallel to contact 16 in the contact region.

Figure 15:
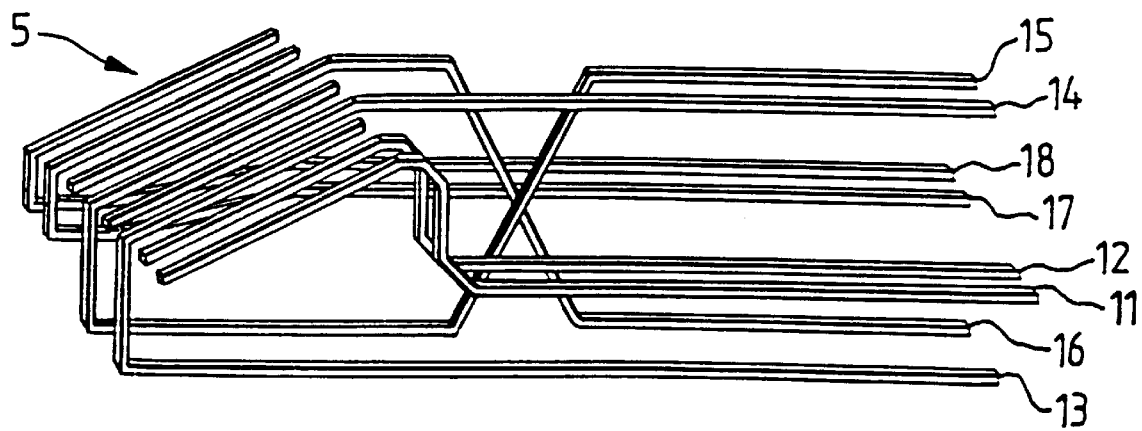
FIG. 15 is a perspective view showing a contact arrangement of four contact pairs in a socket for high transmission frequencies and with complete compatibility with known RJ-45 plugs.

Since compensation has been omitted, the contact 18 runs parallel with contact 17, so that the contact arrangement illustrated in FIG. 15 results for the socket. Following the contact region, the contact pair 17, 18 is extended in a position decoupled from the other contact pairs. Since the compensation loops of the contact pairs 13, 16 and 14, 15 produce lateral fields, the two contacts 17, 18 are electrically and magnetically influenced in this region. If the contacts are not identical, this has the same effect as small compensation loops and produces corresponding crosstalk.

Figure 16:
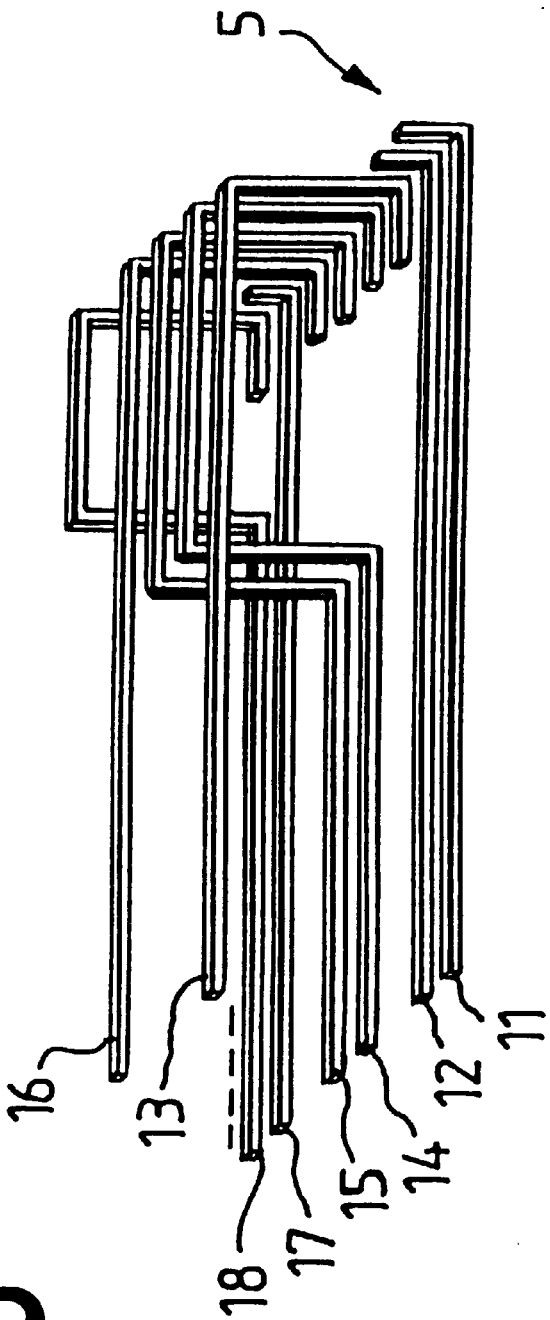
FIG. 16 is a perspective view of a contact arrangement of four contact pairs in a plug for a socket according to FIG. 15.

The complete contact pair arrangement for the plug is illustrated in FIG. 16. In this case, the contact 17 is once more designed in the opposite direction to contact 16, in order to achieve good decoupling. Since measurements have shown that adequate crosstalk attenuation between the contact pairs 17, 18 and 13, 16 is not achieved in the socket, appropriate compensation in the plug is necessary. For this reason, contact 18 runs in the same direction as contact 16 and a little parallel.

In order that the results achieved with respect to the decoupling and compensation of the contacts are maintained, the extension of the contacts toward the connection region must be extended in an appropriately decoupled manner. To this end, there is also, on the one hand, the possibility of using sheet metal shields or, on the other hand, guiding the contacts in a decoupled position. Because of the different contact arrangement between socket and plug, there are also different preconditions for searching for a decoupled position.

Figure 17:
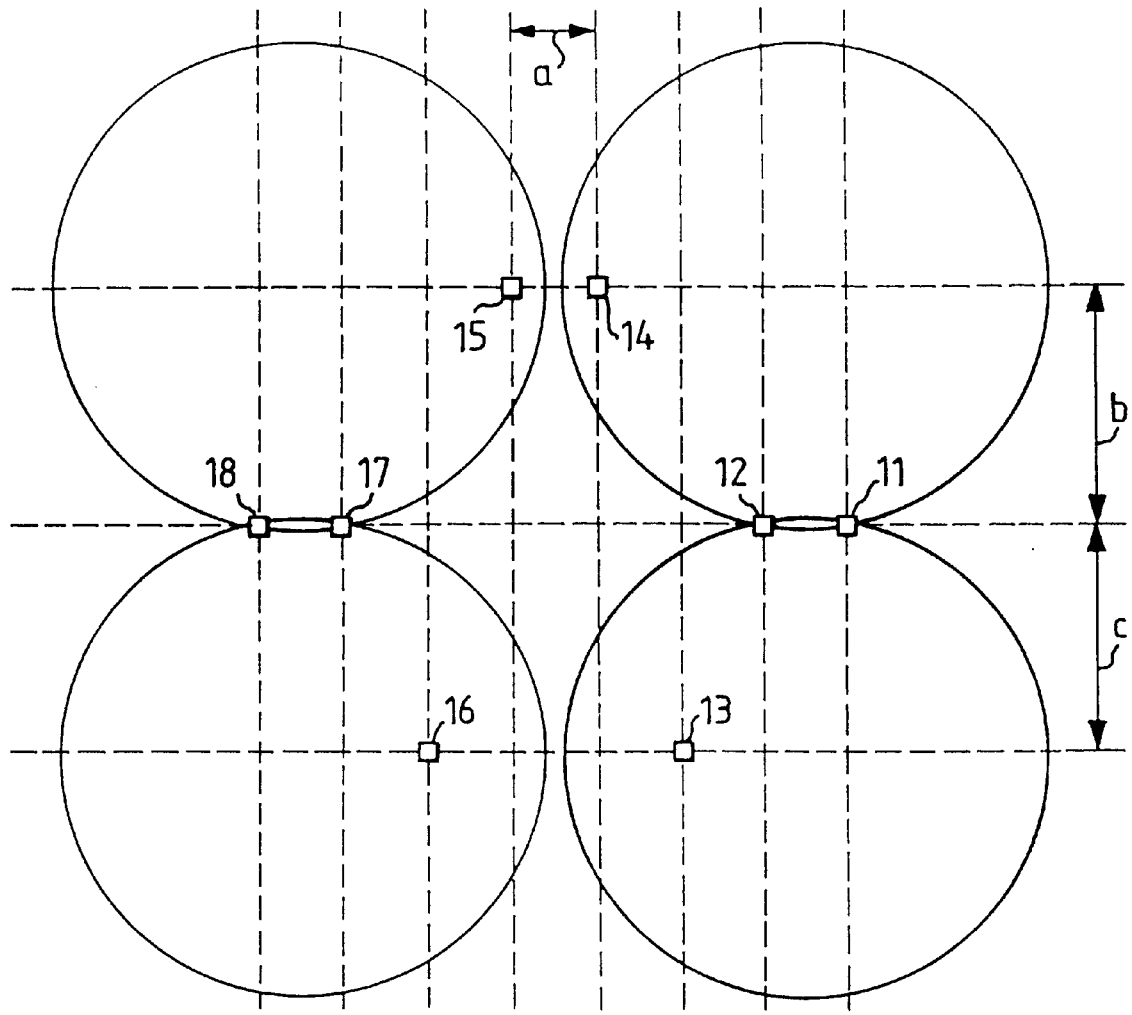
FIG. 17 is a diagram showing an arrangement of the four contact pairs in the connection region of the socket according to FIG. 15.

One possible arrangement of the contacts 11-18 in the connection region of the socket is illustrated in FIG. 17. Because of the large distance between the contact pairs 13, 16 and 14, 15, their crosstalk is low and negligible given a suitable design of the compensation. The two outer contact pairs 11, 12 and 17, 18 are arranged on a magnetic field line of the inner contact pairs 13, 16 and 14, 15, which result in complete decoupling. According to a specific calculation, for a contact spacing a, b=2.915a and c=2.78a result for the required decoupling.

Figure 18:
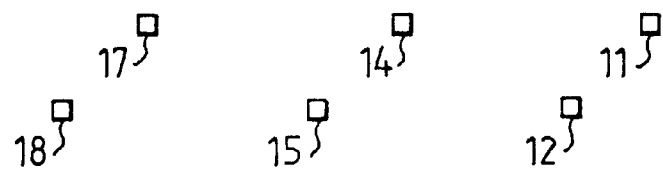
FIG. 18 is a diagram of an arrangement of three contact pairs, arranged underneath a sheet metal shield, in the connection region of a plug according to FIG. 16.

In the case of the plug, a sheet metal shield is arranged toward the connection region, the contact pair 13, 16 being arranged above and the remaining three other contact pairs below the sheet metal shield. In order to ensure decoupling between the contact pairs underneath the sheet metal shield, the contacts of one contact pair are arranged offset with respect to one another, with the result that the contact pairs are located on equivalent equipotential lines of the other contact pairs, which is illustrated in FIG. 18.

While specific embodiments of the invention have been shown and described in detail to illustrate the application of the principles of the invention, it will be understood that the invention may be embodied otherwise without departing from such principles.

What is claimed is:

1. An arrangement of at least two contact pairs, comprising:
    a contact region formed by individual contacts of the contact pairs;
    at least one contact of a contact pair having an angled away portion, angled away at least once from the contact region;
    a parallel run region provided after said angled away portion;
    a distance between the contacts of different contact pairs in said parallel run region being set to provide crosstalk which is in antiphase with crosstalk of said contact region; and
    a compensation region, said parallel run region forming at least a part of said compensation region said contact zone forming part of said compensation region.

2. The arrangement according to claim 1, wherein the contacts of the contact pair are arranged symmetrically beside one another in said contact region, said parallel run region forming at least a part of a compensation region and the distance in the compensation region between the contacts of different contact pairs is smaller than the distance between the contacts of a contact pair.

3. The arrangement according to claim 1, wherein the contacts of the contact pair are arranged nested in one another symmetrically in the contact region, said parallel run region forming at least a part of a compensation region and in the compensation region the planes covered between the contacts include an angle a<90°.

4. The arrangement according to claim 1, wherein said contacts are designed such that they are at least partially flattened.

5. The arrangement according to claim 1, wherein said contacts, following a equidirectional extension portion, are designed such that they are angled away toward an associated contact of each contact pair, with the result that the smaller distance between the contacts produces crosstalk which is in phase with the contact region.

6. An arrangement of at least two contact pairs, comprising: a contact region formed by individual contacts of the contact pairs, said contacts of each contact pair extending in opposite directions from the contact region;
    each contact pair having an angled away portion, angled away at least once from the contact region in the same direction;
    a parallel run region provided after said angled away portion; and
    a distance between the contacts of different contact pairs in said parallel run region set to provide crosstalk which is in antiphase with crosstalk of said contact region.

7. An arrangement of at least two contact pairs, comprising: a contact region formed by individual contacts of the contact pairs:
    at least one contact of a contact pair having an angled away portion, angled away at least once from the contact region;
    a parallel run region provided after said angled away portion; and
    a distance between the contacts of different contact pairs in said parallel run region being set to provide crosstalk which is in antiphase with crosstalk of said contact region, wherein the contacts of each contact pair are designed to be equidirectional and parallel in the contact region.

8. An arrangement of at least two contact pairs, comprising: a contact region formed by individual contacts of the contact pairs;
    at least one contact of a contact pair having an angled away portion, angled away at least once from the contact region;
    a parallel run region provided after said angled away portion, and a distance between the contacts of different contact pairs in said parallel run region set to provide crosstalk which is in antiphase with crosstalk of said contact region, wherein the contacts of the contact pair are arranged to be parallel and in mutually opposite directions in the contact region.

9. An arrangement of at least two contact pairs, comprising: a contact region formed by individual contacts of the contact pairs;

at least one contact of a contact pair having an angled away portion, angled away at least once from the contact region;

a parallel run region provided after said angled away portion; and a distance between the contacts of different contact pairs in said parallel run region set to provide crosstalk which is in antiphase with crosstalk of said contact region, said parallel run region forming at least a part of a compensation region, in order to limit the compensation region, the contacts extending in a decoupled position with respect to one another.

10. An arrangement of at least two contact pairs, comprising: contact region formed by individual contacts of the contact pairs;

at least one contact of a contact pair having an angled away portion, angled away at least once from the contact region;

a parallel run region provided after said angled away portion; and a distance between the contacts of different contact pairs in said parallel run region set to provide crosstalk which is in antiphase with crosstalk of said contact region, said contact pairs include four contact pairs with an inner contact pair nested in another contact pair, wherein the associated contacts of the inner contact pair and said another contact pair are arranged to be parallel and extending in mutually opposite directions in said contact region and, following the contact region, are led in loops relative to one another.

11. The arrangement according to claim 10, wherein the contacts of a first outer contact pair of said contact pairs are arranged continuously parallel to one another, the contact being led, in the contact region, parallel and in the opposite direction to the next adjacent contact of the inner contact pairs.

12. The arrangement according to claim 11, wherein the contacts of a second outer contact pair of said contact pairs are arranged continuously parallel to one another, the contact being led in the contact region, parallel and in the opposite direction to the next adjacent contact of the inner contact pairs.

13. The arrangement according to claim 12, wherein the two outer contact pairs are arranged, in the connection region, on a magnetic field line of the inner contact pairs.

14. The arrangement of the contact pairs of a plug for a socket according to claim 10, wherein the contacts are led out in parallel over the contact region and the contacts of the one contact pair are then angled away twice in such a way that the contact pairs are located in a position virtually decoupled with respect to one another or are decoupled from one another by means of a sheet metal shield arranged between the contact pairs.

15. The arrangement according to claim 14, wherein the contacts of a first outer contact pair of said contact pairs are designed to be continuously parallel to one another, the contact being arranged, in the contact region, parallel and in the opposite direction to the next adjacent contact of the inner contact pairs.

16. The arrangement according to claim 15, wherein the contacts of a second outer contact pair of said contact pairs are arranged, in the contact region, parallel and in the opposite direction to one another, and are then extended in the form of a compensation loop, one contact being arranged to be equidirectional to another contact in the contact region and parallel in the region of the compensation loop.

* * * * *

UNITED STATES PATENT AND TRADEMARK OFFICE
CERTIFICATE OF CORRECTION

PATENT NO. : 6,017,247
DATED : January 25, 2000
INVENTOR(S) : Michael Gwiadzowski Page 1 of 1

It is certified that error appears in the above-identified patent and that said Letters Patent is hereby corrected as shown below:

Please correct the list of patent documents to include the following references.

| | | |
|---|---|---|
| US 5,679,027 | Oct. 21, 1997 | Smith |
| US 5,626,497 | May 6, 1997 | Bouchan et al |
| US 5,580,270 | Dec. 3, 1996 | Pantland et al |
| US 5,647,770 | July 15, 1997 | Belopolsky |
| US 5,634,817 | June 3, 1997 | Seimon et al |
| US 5,299,956 | April 5, 1994 | Brownell et al |
| US 5,470,244 | Nov. 28, 1995 | Lim et al |

| | | |
|---|---|---|
| EP 0 598 192 A1 | May 25, 1994 | Germany |
| EP 0 692 884 A1 | Jan. 17, 1996 | Europe |
| EP 0 601 829 A2 | June 15, 1994 | Europe |
| WO 94/06216 | Mar. 17, 1994 | Europe |

Signed and Sealed this

Eleventh Day of September, 2001

*Attest:*

*Attesting Officer*

NICHOLAS P. GODICI
*Acting Director of the United States Patent and Trademark Office*